United States Patent
Kim et al.

(10) Patent No.: US 9,522,712 B2
(45) Date of Patent: Dec. 20, 2016

(54) COUPLING METHOD FOR A SEPARABLE BICYCLE

(76) Inventors: Chong Chul Kim, Daejeon (KR);
Hwan Young Kim, Daejeon (KR)

( * ) Notice: Subject to any disclaimer, the term of this patent is extended or adjusted under 35 U.S.C. 154(b) by 210 days.

(21) Appl. No.: 13/983,696

(22) PCT Filed: Jun. 20, 2011

(86) PCT No.: PCT/KR2011/004497
§ 371 (c)(1),
(2), (4) Date: Aug. 5, 2013

(87) PCT Pub. No.: WO2012/118252
PCT Pub. Date: Sep. 7, 2012

(65) Prior Publication Data
US 2013/0312244 A1    Nov. 28, 2013

(30) Foreign Application Priority Data

Mar. 3, 2011    (KR) .................. 10-2011-0018755

(51) Int. Cl.
*B62K 15/00* (2006.01)
*B62K 19/18* (2006.01)

(52) U.S. Cl.
CPC .............. *B62K 19/18* (2013.01); *B62K 15/00* (2013.01); *Y10T 29/49947* (2015.01)

(58) Field of Classification Search
CPC . B62K 15/00; B62K 15/006; Y10T 29/49948; Y10T 29/49963
USPC ................................................ 280/278, 287
See application file for complete search history.

(56) References Cited

U.S. PATENT DOCUMENTS

| | | | | |
|---|---|---|---|---|
| 2,211,164 A | * | 8/1940 | Rippenbein | .................. 280/287 |
| 2,401,923 A | | 6/1946 | Gleeson | |
| 3,194,592 A | | 7/1965 | Boughton | |
| 3,304,099 A | * | 2/1967 | Jankowski | ............. B62K 15/00 |
| | | | | 280/287 |
| 3,883,157 A | * | 5/1975 | Simpkins | ............. B62K 15/008 |
| | | | | 280/287 |
| 2009/0256330 A1 | | 10/2009 | Daniels | |

FOREIGN PATENT DOCUMENTS

| | | |
|---|---|---|
| DE | 3212783 | 10/1983 |
| JP | 11-115861 | 4/1999 |
| JP | 2000-085671 | 3/2000 |
| WO | 88/05136 | 7/1988 |

OTHER PUBLICATIONS

International Search Report for PCT/KR2011/004497 mailed Feb. 10, 2012.

* cited by examiner

*Primary Examiner* — Jason L Vaughan
*Assistant Examiner* — Amanda Meneghini
(74) *Attorney, Agent, or Firm* — STIP Law Group, LLC

(57) ABSTRACT

The present invention relates to a coupling method for a separable bicycle, in which the front wheel and the rear wheel are easily separated from and coupled to each other such that the front and rear wheels are firmly coupled to each other even if the separable bicycle is operated for a long period of time.

6 Claims, 3 Drawing Sheets

COUPLING METHOD FOR A SEPARABLE BICYCLE

RELATED APPLICATIONS

This application is a 371 application of International Application No. PCT/KR2011/004497, filed Jun. 20, 2011, which in turn claims priority from Korean Patent Application No. 10-2011-0018755, filed Mar. 3, 2011, each of which is incorporated herein by reference in its entirety.

TECHNICAL FIELD

The present invention relates to a coupling method for a separable bicycle which has features in that a bicycle can keep a tightly coupled state even though it is used long time in a separable bicycle equipped with a front wheel part and a rear wheel part separated or coupled for the sake of easier carry or storage or for the sake of use in a form of a train-chained bicycle, thus preventing the developments of rattles and loosening, so disengagement and coupling work become easy.

BACKGROUND ART

The frame of a bicycle light and capable of maintaining a certain strength is generally made of a tube structure. When a front wheel part and a rear wheel part are coupled, a tube or a rod inserted into the interior of the above mentioned coupling tube is coupled into either end of a separated portion and is fixed using a pin or the like so that it cannot be separated. In this case, it is possible to fix in order that the couple portion may not be loosened; however the tube or the rod is inserted into the connection tube connecting the front wheel part and the rear wheel part should have a diameter smaller than that of the coupling tube for the sake of an insertion and separation, so a certain rattle and loosening might occur between the front wheel part and the rear wheel part due to a gap formed owing to the difference in the diameters after they are coupled, and it is hard to have a desired safety after long time operation.

Disclosure of Invention

Accordingly, the present invention is made in consideration of the above mentioned problems. It is an object of the present invention to provide a coupling method for a separable bicycle which has features in that a coupling tube is connected using two pieces of short rods inserted into the inner side of the cut portion of the coupling tube connecting the front wheel part and the rear wheel part or the handle, and the coupled portion is fastened by a clamp or a bolt and a nut so that it cannot be separated. At this time, the portions between the short rods inserted in either end of the interior of the coupling tube are made not to have any gaps, so the developments of rattles and loosening between the front wheel part and the rear wheel part or the handle do not develop while a user rides a bicycle, so the coupling tube or the short rods is not damaged even when the bicycle is used for long time.

Meanwhile, plates each with a wider surface area than the cross section of the coupling tube are welded at either end of the cut coupling tube, which does not provoke the formation of a gap at a portion where two surfaces meet each other, so the above mentioned effects can be obtained after the coupling.

To achieve the above objects, the present invention has features in that the outer diameters of two pieces of short rods inserted in the inner sides of either end of the cut portion of the coupling tube coupling the front wheel part and the rear wheel part or the handle are same as the inner diameters of the coupling tube and are inserted as they tightly meet each other at slanted face, and with these features it is easy to prevent any gap from being formed between the two short rods as well as between the short rods and the coupling tube after coupling. In other words, the outer diameter of the short rod inserted in the interiors of either end of the cut tube is made same as the inner diameter of the coupling tube, and the portion where the short rods are opposite to each other is carved at the same angles, or one side is made in a conical shape and the other side is in a opposite-conical shape matching with the conical shape. In this way, it can easily start inserting into between the widened portions when fitting and inserting the same; however even when it is fully inserted, no gap is formed between the two short rods as well as between the coupling tube and the short rods, so it can prevent breakage of coupling part due to continual fatigue because they are coupled looking like one connection, and consequently produce no rattles during operations. Even when one body construction is constructed without any gaps with the aid of the two short rods inserted in the inner side of the cut portion of the coupling tube coupling the front wheel part and the rear wheel part or the handle, since the force applied in opposite direction may easily separate them, the coupled portions won't easily loose in such a way to fasten with a clamp or a bolt and a nut with the aid of a ridge or a shoulder formed at either end of the outer side of the cut coupling tube.

Meanwhile, when plates each with a wider surface area than the cross section of the coupling tube are welded at either end of the cut coupling tube, the welding work is performed at an angle by which a gap is not formed between two meeting surfaces, and at least two portions are fastened so that the two meeting surfaces are not parted by an external force, and it is fastened with a clamp surrounding the outer sides of the two meeting surfaces, by which a multiple locking operation is obtained, so no rattles and loosening develop during operations.

Advantageous Effects

When it needs to use a separable bicycle which can be separated for the sake of an easier carry or an easier loading into a trunk in such a way to half reduce the volume or weight by completely separating the front wheel part and the rear wheel part, a small gap formed at the coupled portion may cause continuous rattles while a user rides, so the coupled portions may be easily loosened and damaged, the problems of which can be prevented by the method of the present invention.

When the coupling tube is coupled using two short rods obliquely carved at same angles at the inner side of either cut end, no gap is formed between the two short rods as well as between the coupling tube and the two short rods after the short rods are fully inserted. With these effect the coupling part looks like one body coupling structure without separated part, so breakage due to the accumulated fatigues can be prevented because rattles and loosening don't develop at coupling part during operations.

In addition, the plates each with a surface area wider than the cross section of the coupling tube are welded at an angle at either end of the cut coupling tube so that no gap is formed between two meeting surfaces, and at least two portions are fastened with a fixing device so that the two surfaces are not parted by an external force, and a clamp surrounding the outer sides of the two meeting surfaces can be fastened, which provides a multiple locking operation, so no rattles develop during operations.

LEGENDS OF REFERENCE NUMERAL WITH RESPECT TO THE KEY ELEMENTS OF THE DRAWINGS

Figure 1:
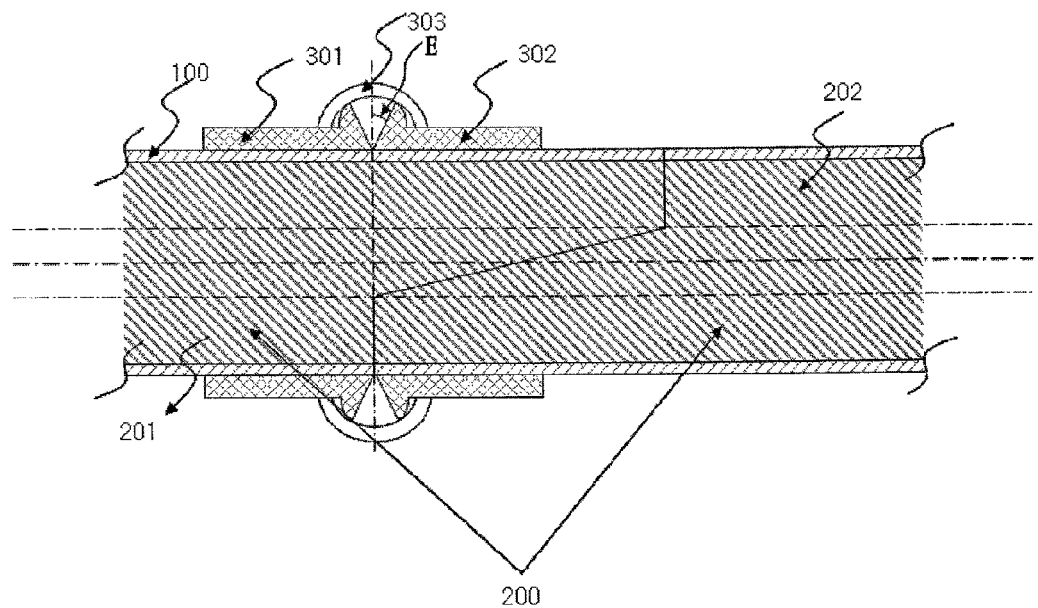
FIG. 1 is a cross sectional view illustrating a result after two pieces of obliquely carved and cylindrical short rods inserted in the inner side of the cut portion of a coupling tube connecting a front wheel part and a rear wheel part or a handle are inserted facing each other at an inclination without forming any gaps between them, and the above portions are coupled using a clamp so as to prevent the separation of the same.
Figure 2:
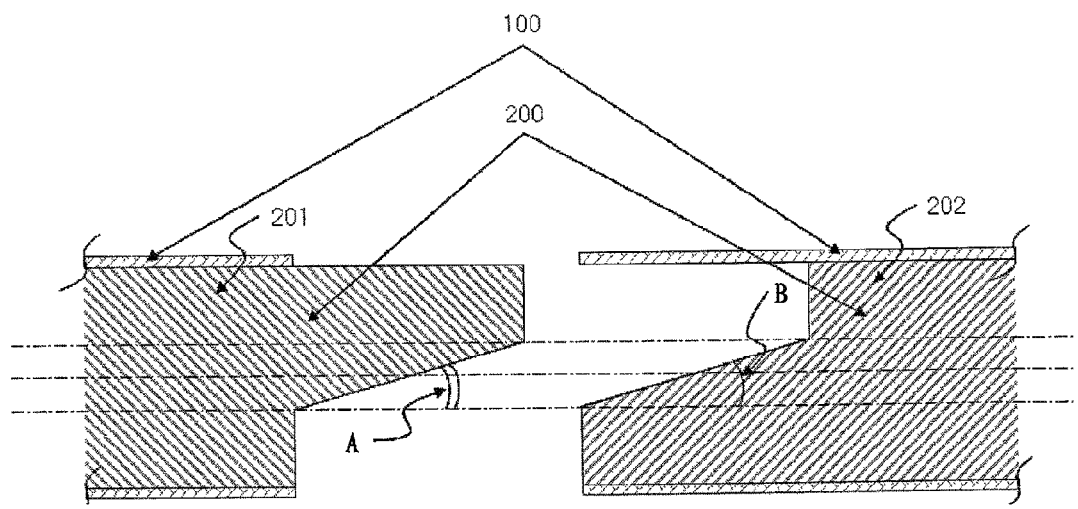
FIG. 2 is a cross sectional view illustrating a state when two pieces of obliquely carved and cylindrical short rods inserted in the inner side of the cut portion of a coupling tube, which couples a front wheel part and a rear wheel part or a handle, are separated.
Figure 3:
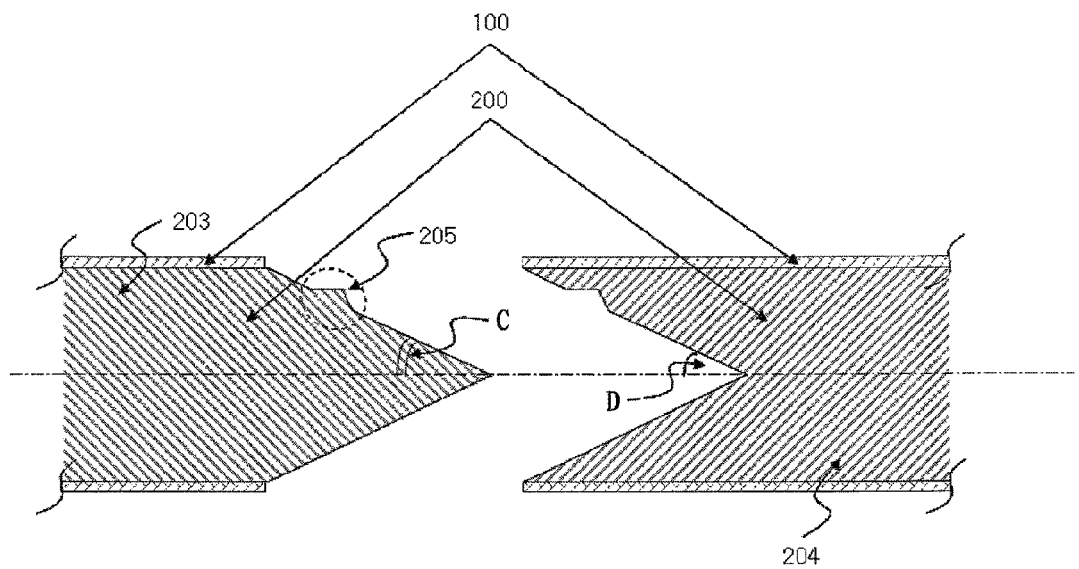
FIG. 3 is a cross sectional view illustrating a state when a conical short rod inserted in the inner side of the cut portion of a coupling tube connecting a front wheel part and a rear wheel part or a handle is separated from an opposite-conical short rod into which the conical portion is tightly inserted.
Figure 4:
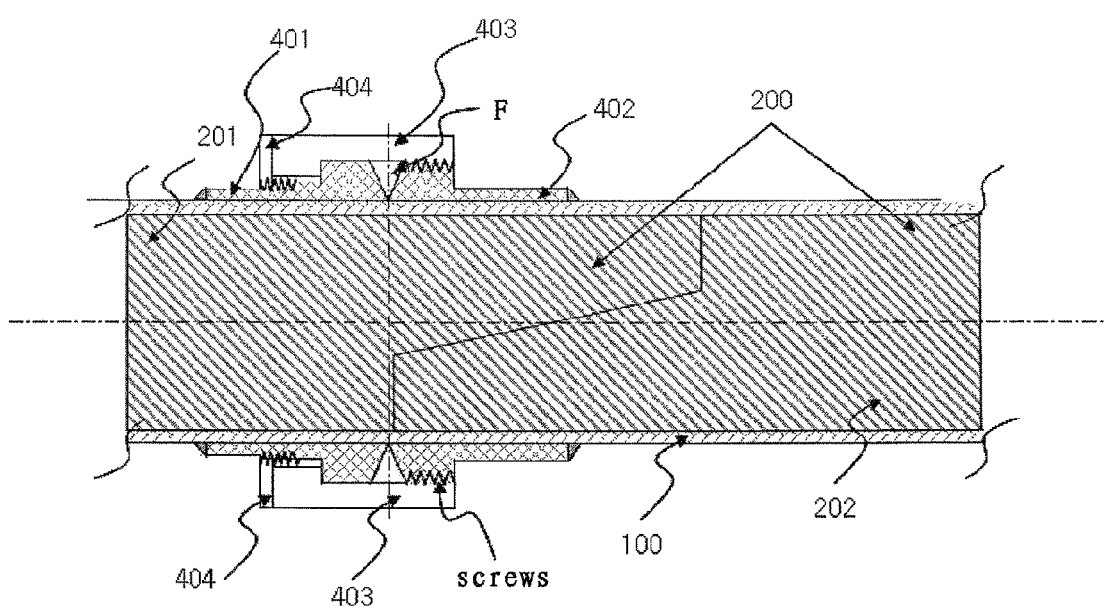
FIG. 4 is a cross sectional view illustrating a state when two pieces of obliquely carved and cylindrical short rods inserted in the inner side of the cut portion of a coupling tube coupling a front wheel part and a rear wheel part or a handle are inserted facing each other without forming any gaps between them, and the above portion is coupled using a bolt and a nut so as to prevent the separation of them.
Figure 5:
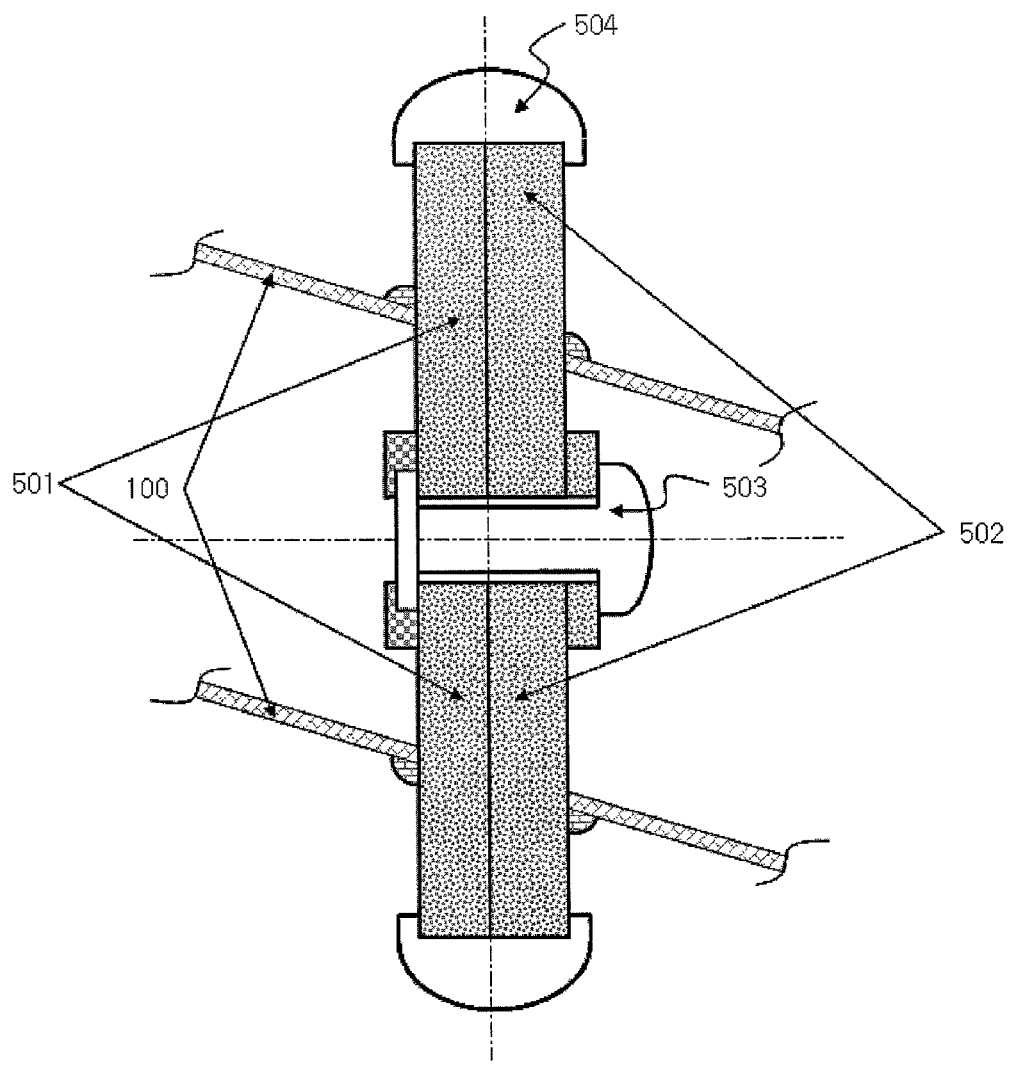
FIG. 5 is a side view illustrating a result after plates each wider than the cross section of a coupling tube are welded at either end of a coupling tube coupling a front wheel part and a rear wheel part, and at least two portions are fastened with a fixing device so that the two plates can be tightly fastened, and along the outer surrounding of each of the two plates is coupled a clamp.

100: a coupling tube coupling a front wheel part and a rear wheel part or a handle
200: a short rod inserted in a cut coupling tube 100
201: half a short rod inserted in one side of a cut coupling tube 100
202: half a short rod inserted in the other side a cut coupling tube 100
203: a conical short rod inserted in one side of a cut coupling tube 100
204: an opposite-conical short rod inserted in the other side of a cut coupling tube 100
205: a key preventing the rotation of a conical element.
301, 302: reinforcing tubes with ridges
303: a clamp surrounding the ridges of the two reinforcing tubes 301 and 302
401: a reinforcing tube propped so as to prevent a nut 403 from departing in the direction of one side with the aid of a shoulder provided at the same
402: a reinforcing tube with a screw at one end for the role of a bolt
403: a nut fastened so as to prevent the two reinforcing tubes 401 and 402 from being parted
404: a nut fastened so as to prevent a nut 403 from loosening
501, 502: a plate welded at a coupling tube coupling a front wheel part and a rear wheel part
503: a fixing device fastened two opposite plates 501 and 502
504: a clamp surrounding the outer sides of two plates 501 and 502
A, B: angles of inclination at which half pieces of opposite short rods are carved
C: an angle with respect to inclination of a conical short rod
D: an angle with respect to inclination at which an opposite-conical short rod is grooved
E: an angle at which one ridge is carved at the portion where ridges formed at the ends of two reinforcing tubes 301 and 302 are opposite to each other
F: an angle at which one shoulder is carved at the portion where shoulders formed at the ends of two reinforcing tubes 401 and 402 face to each other

BEST MODES FOR CARRYING OUT THE INVENTION

According to a preferred embodiment of the present invention, the outer diameters of two pieces of rods 201 and 202 inserted in the inner sides of either end where a coupling tube 100 coupling a front wheel part and a rear wheel part or a handle is cut are made identical with the inner diameter of the coupling tube, respectively, and when they are inserted in such a way to meet tightly with each other at slanted face, the slantwise carved angles (A and B) are made identical. When one side 203 of the short rod is formed in a conical shape, the carved angle (D) of the opposite-conical shape 204 is made identical, for the other side to fit tightly the same, with the angle (C) of the inclination that the conical shape 203 has. In this way, the short rod 201, 203 of one side can be easily inserted into between the widened portions during the coupling work, which provides advantages.

In addition, when coupling for a user to ride a bicycle, even when one body construction is obtained without any gaps by means of two short rods 201 and 202 or 203 and 204 inserted in the inner sides of either end of the cut portion of the coupling tube coupling the front wheel part and the rear wheel part or the handle, such coupled structure may be easily separated by the force applied in opposite directions, so they are fastened with the clamp by using the ridges formed at the reinforcing tubes 301 and 302 propped at the outer side of either end where the coupling tube 100 is cut or it can be fastened a nut which does not go over the shoulder formed at the reinforcing tube 401 and a bolt formed at the other reinforcing tube 402, so the coupled portion won't loosen. At this time, a nut 404 may be further fastened so as to prevent the nut 403 from being loosened due to the vibrations occurring when a user rides a bicycle.

When the short rods 201, 202, 203, 204 are tightly coupled in the inner sides of the cut coupling tube 100, the short rods 201 and 203 won't be well disengaged when separating them, so the portion between the ridge and the shoulder is carved at a certain angle (E, F) so that an opposite force can be transferred with the aid of a device with a V-shaped end portion which help disengaged well the above mentioned portions by forming a gap between the two ridges and the two shoulders.

When it needs to weld the plates 501 and 501, which have the surface areas wider than the cross section of the coupling tube 100, at either end of the cut coupling tube 100, it is welded at an angle which helps prevent the formation of the gap between the two meeting surfaces. In addition, at least two portions are fastened with the aid of the fixing device 503 so that the two meeting surfaces are not parted by an opposite force, and it may be fastened with a clamp 504 which surrounds the outer sides of the two meeting surfaces for thereby achieving a multiple locking structure, so no rattles develop during operations, and parting phenomenon can be prevented.

The invention claimed is:

1. A coupling method for a separable bicycle, comprising: cutting a coupling tube, coupling a front wheel part and a rear wheel part; carving a first short rod and a second short rod obliquely at same angles forming a slanted face, wherein the first and the second short rods are inserted in an inner side of either end where the coupling tube is cut and the first and the second short rods contact each other at an inclination inside the coupling tube; forming a ridge outside the either end of the coupling tube; forming a fastening feature that comprises a clamp, or a bolt and a nut, wherein the fastening feature is fastened using the ridge; wherein the ridge consists of a first ridge and a second ridge and the first ridge and the second ridge are formed respectively on a first reinforcing tube and a second reinforcing tube located at the outside either end of the coupling tube, and an end of each of the first and the second ridges is carved such that the first and the second ridges form a V-shaped gap when the first and the second ridges are brought together so that the first and the second ridges are easily parted when an external force is applied to the V-shaped gap between the first and the second ridges using a device with a V-shape.

2. The coupling method for a separable bicycle according to claim 1, wherein the first and the second short rods have a cylindrical shape, and outside diameters of the first and the second short rods are substantially identical to an inside diameter of the coupling tube such that a tight connection is formed when the first and second short rods are inserted into the coupling tube, and wherein the angle of the inclination of the first short rod is substantially identical with the angle of the inclination of the second short rod, and the angle of the inclination of the first short rod is in a range of 0.5 to 45 degrees.

3. The coupling method for a separable bicycle according to claim 1, wherein the fastening feature is the clamp, and the clamp is fastened about the ridge after the first and the second short rods are inserted into the inner sides of either end where the coupling tube is cut and the first and the second short rods contact each other at the slanted face, and wherein the V-shaped gap has a range of 5 to 30 degrees.

4. The coupling method for a separable bicycle according to claim 1, wherein the fastening feature is the bolt and the nut and wherein the bolt and the nut are fastened such that the first and the second short rods contact each other at the slanted face, and wherein the nut and the bolt are each attached to one of the first ridge or the second ridge, and wherein the V-shaped gap is in a range of 5 to 30 degrees.

5. The coupling method for a separable bicycle according to claim 1, wherein a side surface of each of the first and the second short rods has a first flat surface, a second flat surface, and a third flat surface located between and directly contacting the first flat surface and the second flat surface, wherein: the first flat surface, the second flat surface, and the third flat surface aligns vertically, and obliquely with respect to a longitudinal direction of the first and the second short rods, respectively; and the side surface of the first short rod directly contacts the side surface of the second short rod without a substantial gap there between, and wherein outside diameters of the first and the second short rods are substantially identical with an inside diameter of the coupling tube such that a tight connection is formed with an inside diameter of the coupling tube.

6. The coupling method for a separable bicycle according to claim 1, wherein the first and the second short rods which are inserted in the inner sides of either end of the coupling tube are carved in a conical shape forming the inclination, wherein the inclination of the conical shape of the first short rod is made with an angle that is inserted into an identical angle of the second short rod forming a tight connection between the first and the second short rods; wherein the angles of the conical shape are in a range of 20 to 40 degrees.

* * * * *